United States Patent [19]

Kobayashi et al.

[11] Patent Number: 4,909,888

[45] Date of Patent: Mar. 20, 1990

[54] TRANSFER PRINTING APPARATUS

[75] Inventors: Yukio Kobayashi, Tokyo; Shoji Igota, Kawasaki, both of Japan

[73] Assignee: Nissei ASB Machine Co., Ltd., Nagano, Japan

[21] Appl. No.: 186,488

[22] PCT Filed: Jul. 8, 1987

[86] PCT No.: PCT/JP87/00485

§ 371 Date: Mar. 7, 1988

§ 102(e) Date: Mar. 7, 1988

[87] PCT Pub. No.: WO88/00136

PCT Pub. Date: Jan. 14, 1988

[30] Foreign Application Priority Data

Jul. 8, 1986 [JP] Japan ................................ 61-158813

Feb. 10, 1987 [JP] Japan ................................ 62-29030

[51] Int. Cl.[4] ...................... B32B 31/00; B65H 26/00; B42C 9/00; B65C 3/00

[52] U.S. Cl. ................................ 156/361; 156/477.1; 156/542; 156/567

[58] Field of Search ............... 156/230, 238, 240, 249, 156/361, 541, 542, 566, 567, 568, 362, 456, 476, 477.1

[56] References Cited

U.S. PATENT DOCUMENTS

| | | | |
|---|---|---|---|
| 4,288,275 | 9/1981 | Davis | 156/541 |
| 4,336,095 | 6/1982 | Hoffmann | 156/361 |
| 4,381,211 | 4/1983 | Nechay | 156/542 |
| 4,701,235 | 10/1987 | Mitsam | 156/238 |
| 4,735,664 | 4/1988 | Asgar et al. | 156/361 |

FOREIGN PATENT DOCUMENTS

| | | |
|---|---|---|
| 52-139435 | 11/1977 | Japan . |
| 53-63032 | 6/1978 | Japan . |
| 57-18257 | 1/1982 | Japan . |
| 61-283599 | 12/1986 | Japan . |

*Primary Examiner*—Michael W. Ball
*Assistant Examiner*—Louis Falesco
*Attorney, Agent, or Firm*—Weingarten, Schurgin, Gagnebin & Hayes

[57] ABSTRACT

A transfer printing method and an apparatus therefor which applies an induction heat generation jacket roller based on the principle of exothermic low-frequency induction heating to a heat roller, supplies continuously a printing layer disposed on a transfer film and an object of transfer whose drum is cylindrical to the roller surface of the heat roller in order to make it possible to transfer simultaneously to a plurality of objects of transfer and can prevent transfer slippage by adjusting in advance the position of the printing layer relative to each object of transfer.

9 Claims, 6 Drawing Sheets

FIG. 8
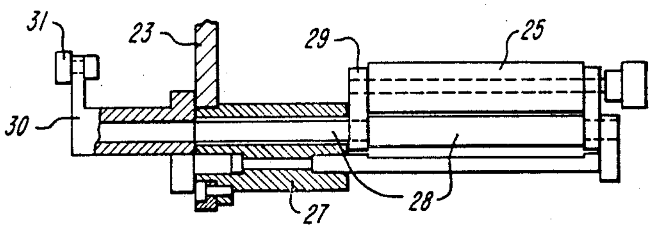
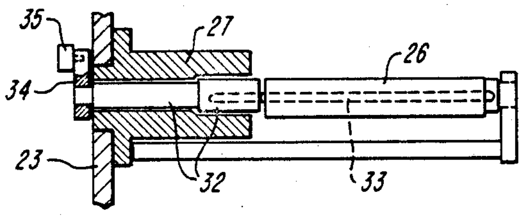
FIG. 9
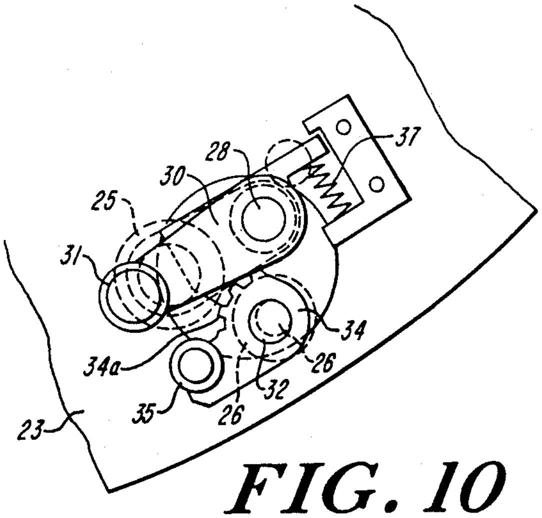
FIG. 10

TRANSFER PRINTING APPARATUS

TECHNICAL FIELD

This invention relates to a transfer printing method for transferring a printing layer on a synthetic resin film surface, by heating and pressing, to a drum of a container whose drum is cylindrical, particularly to a drum of a thin-wall container.

In the conventional transfer of this kind, a transfer sheet of paper is supplied between a heat roller and a cylindrical container with a printing layer of the surface directed toward the container, the transfer paper together with the container is pressed against the heat roller, and the container is rotated with respect to a transfer film by utilization of rotation of the heat roller. In such a transfer as just mentioned, a number of containers cannot be continuously treated or process by a single heat roller, and when the speed is increased in order to enhance the processing ability, a transfer slippage occurs. Moreover, since a heater is used as a heating source, if operating time is prolonged, the temperature of the heat roller rises, and where the base of a transfer paper is a synthetic resin film, an elongation occurs due to overheating, leading to a slippage in transfer or melting, etc. When temperature is controlled in order to prevent the overheat, the temperature of the roller surface materially lowers, resulting in insufficient printing of the printing layer after transfer, which leads to a problem such that the printing layer transferred to the container is peeled off due to a slight friction. Further improvement has been required to make in order to continuously obtain products in a good transfer condition.

Under these circumstances as noted above, the present inventors have repeatedly studied on prior method and apparatus, and as the result, found that the causes of the above-described problems resulted from unstableness of heating temperature, unevenness of rotation of the heat roller and moving speed of the transfer paper and the like, and if control is made by any kind of means, a plurality of containers can be successively pressed against a single roller to apply printing to the drum without partly or wholly transfer slippage.

DISCLOSURE OF THE INVENTION

An object of the present invention is to provide a new method and apparatus which can carry out transfer at high speed and positively by means of a heat roller which is always uniform in temperature distribution of a roller surface, easy in temperature control in an electrical manner, and is free from rapid variation in temperature difference before and after the control.

Another object of the present invention is to provide a new transfer printing method and an apparatus therefor which can use a transfer film having a synthetic resin film used as a base, and adjust a position between a container supplied to the heat roller and a printing layer of a transfer film, for each container.

Yet another object of the present invention is to provide a new transfer printing method and an apparatus therefor which comprises applied pressure control means which is extremely effective for aluminum containers whose drum is cylindrical and having an open end equal to the drum, plastic containers, and particularly plastic cans obtained by injection stretching blow molding.

The present invention, which can achieve the aforementioned objects, is characterized by use of an induction heat generation roller based on the principle of exothermic of low-frequency induction heating as a heat roller.

This heat roller has an induction coil incorporated therein as a magnetic flux generation mechanism comprising a coil and a core, in which the roller itself generates a Joule heat by electromagnetic induction action produced by application of voltage, and which is free from heat loss unlike an indirect heating system using a self-contained heater and having a high accurate temperature controllability. In case of a heat roller in which a jacket is provided in the inner peripheral surface of the roller to seal a heating medium therein, further uniform surface temperature distribution characteristic can be always maintained.

In the present invention, a plurality of containers together with a transfer film is pressed against the surface of the heat roller, and rotation of the heat roller is transmitted to the containers through the transfer film whereby the containers are rotated on the surface of the transfer film to transfer a printing layer on the surface of the transfer film to the drum of a container.

The container is loosely filled in a rotatable cylindrical holder, and the transfer film is extended over pitch adjusting rolls disposed at regular intervals in the periphery of the heat roller along with a press roll and is positioned in a heat transfer portion.

The holder is rotatably supported on the end of a member mounted movably up and down by a circulating transport means such as a chain to be positioned between press rolls, forced in and between the press rolls from outside of the transfer film by a pressing mechanism disposed in the heat transfer portion, and pressed against the roller surface along with the transfer film.

This pressing causes the transfer film and the drum of a container to be sandwiched between the heat roller and the holder, and the transfer film is subjected to tension by the pitch adjusting roll. In such a condition, the transfer film is brought into linear contact with the roller surface along with the container drum by the holder, both of which are subjected to local heating and pressure.

Such a condition as described continues till the holder is released from the pressing mechanism and moved away from the roller surface, and through the linear contact locally, that contact will be a continuous contact by movement of position. The printing layer under heating and pressurizing condition, the printing layer is shifted from the surface of the transfer film to the container body, and pressed by the press roller and positively transferred to the container drum.

This transfer can be either partial or front surface with respect to the drum but when transfer begins at a position before or behind a transfer start position on the drum, there occurs a deviation in position, resulting in an incomplete transfer.

This transfer slippage is prevented by rotation of the pitch adjusting roll. The pitch adjusting roll is formed from an eccentric roll to vary the length of travel of the transfer film at the rotative position. The rotation of the pitch adjusting roll is effected on the basis of the result of detection of a mechanism for detecting a position of each printing layer of a transfer film and a mechanism for detecting a position of a transferable member subject to transfer operation.

The detection of the position of each printing layer includes a case where a marginal portion between printing layers is utilized, and a case where a suitable mark pre-printed on a transfer film is utilized. However, if there is a surface of a printing layer which can be used as a mark, it may be utilized. Detection means is preferably one which can remove it as an electric signal, suitably, a photo-electric tube system.

The mechanism for detecting a position of an object of transfer is also preferably one which can remove it as an electric signal. The position of the object of transfer is that a position subject to heat transfer can be detected as the result. For example, a position of an object of transfer after transferred may be measured or a position of a holding member for an object of transfer may be measured to obtain the aforesaid position.

BRIEF DESCRIPTION OF THE DRAWINGS

FIGS. 8 and 9 are respectively sectional views of a press roll portion and a pitch adjusting roll portion.

FIG. 10 is a side view of a press roll shaft arm and a pitch adjusting roll shaft arm portion.

BEST MODE FOR EMBODIYING THE INVENTION

Figure 1:
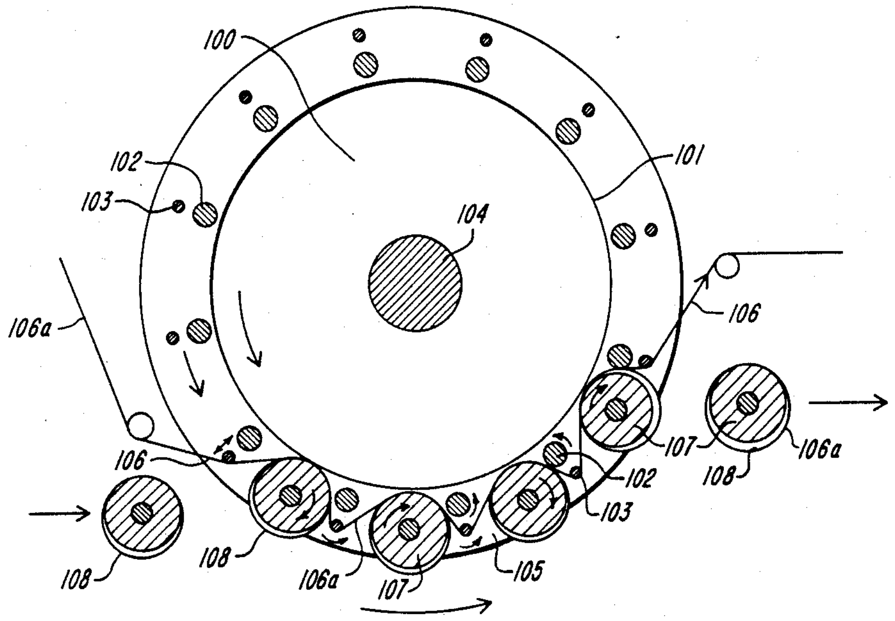
FIG. 1 is an explanatory view of a transfer printing method according to the present invention.

In the drawings, reference numeral 100 designates an induction heat generation jacket roller (hereinafter referred to as a heat roller) based on the principle of exothermic of low-frequency induction heating. The required number of press rolls 102 and pitch adjusting rolls 103 are disposed along a roller surface 101. The press and pitch adjusting rolls are mounted at regular intervals, with the press rolls 102 located inside thereof, on a disk 105 rotatably provided separately from a rotational shaft 104 located at the center of the heat roller 100.

Reference numeral 106 designates a transfer film whose base is a polyethyleneterephthalate stretched film, which is supplied with a printing surface 106a directed outwardly from a left side to a lower portion and thence to a right side of the heat roller 100, and at the lower part of the heat roller 100, placed in abutment with the pitch adjusting roll 103. Rotatable cylindrical holders 107 are positioned externally of the transfer film 106.

The holder 107 is movably mounted on the transport means such as a chain not shown, the holders 107 being provided at regular intervals to be positioned between the press rolls 102. A container 108 whose drum is cylindrical which is loosely fitted at the other position and formed of aluminum or a synthetic resin such as polyethyleneterephthalate together with a transfer film 106 extended over the pitch adjusting rolls 103 are forced into the roller surface 101 of the heat roller 100.

The pitch adjusting roll 103 is mounted movably with respect to the disk 105 and is rotated internally and externally, by a device actuated by a signal from a transfer film monitor system (not shown) at the side of the heat roller 100 in which transfer film and containers are introduced, to correct a deviation in position of the transfer film 106.

The heat roller 100 and disk 105, and the press rolls 102 and pitch adjusting rolls 103 rotate counterclockwise, the holder 107 rotates clockwise, and the transfer film 106 travel rightward. These rotation and travel are all effected at uniform speed.

The spacing between the press roll 102 and holder 107 is set according to the spacing of a printing layer 106a of the transfer film 106, and the transfer of the container 108 to the drum is controlled to be started from the end of the printing layer 106a.

The transfer is completed when the container 108 is held by the holder 107 and finished its full rotation together with the holder 107 by the heat roller 100, and at the transfer completed position, the press roll 102 and the transfer film 106 are immediately moved away from the container 108.

Accordingly, heating and transfer are continuously carried out till the container 108 supplied together with the transfer film 106 is placed in linear contact with the roller surface 101 of the heat roller 100 by the holder 107, finishes a full rotation and is moved away from the roller surface 101. By the local heating by the synchronous linear contact therebetween, the surface of the container 108 will not be overheated or molten even if the heating temperature is high, 150° C. to 200° C., and the printing layer 106a is successively transferred to the drum surface of the container 108 and at the same time becomes so printed as not to be peeled off easily.

Figure 3:
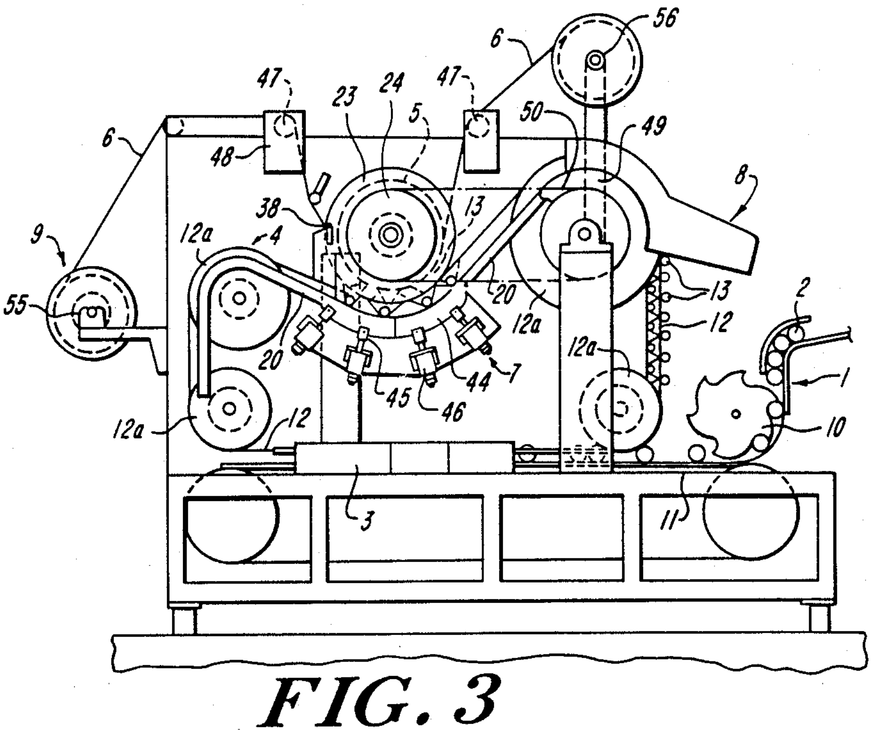
FIG. 3 is a schematic front view of a transfer apparatus according to the present invention.
Figure 2:
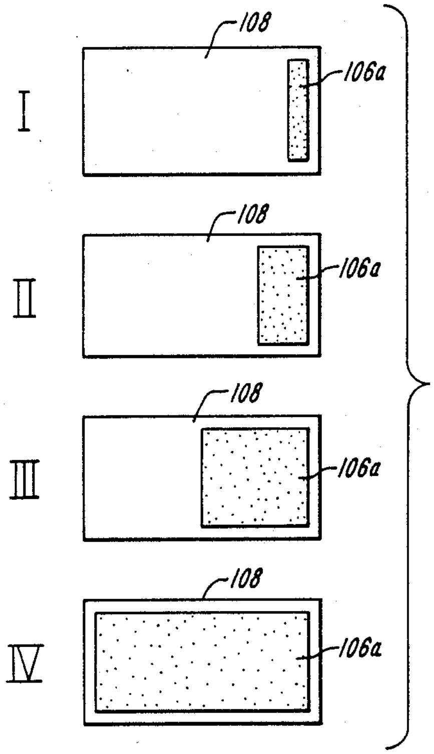
FIG. 2 is an explanatory view showing the transfer state at positions from I to III in FIG. 1 with an object of transfer developed.

FIG. 3 and thereafter drawings show an overview of a specific example of transfer apparatus. Reference numeral 1 designates a carry-in mechanism for carrying in aluminum or plastic cans 2 as objects of transfer being fed from other stations at fixed intervals, and 3 a guide rail for feeding the cans 2 fed at fixed intervals by the carry-in mechanism 1 into a supply mechansim 4 to a heat transfer station.

The supply mechansim 4 to the heat transfer station feeds the cans 2 not filled with contents having been fed from the carry-in mechanism 1 to the underside of the heat roll 5 while the cans 2 being held. The heat roll 5 transfers a transfer film 6 to the can 2 while heating the film 6. Reference numeral 7 designates a press mechanism provided below the heat roll 5 to urge the can 2 against the heat roll 5 and into abutment therewith. Reference numeral 8 designates a mechanism for ejecting the transferred cans 2, and 9 a supply mechanism for feeding a transfer film 6 to a transfer station.

The carry-in mechanism 1 has a timing belt 11 provided in proximity of a lower end of a star wheel 10 at the lower part of a chute. This timing belt 11 has a partition plate which separates cans 2 at fixed intervals.

On the timing belt, the guide rail 3 is projected obliquely toward the moving direction. Though not shown, the cans 2 on the timing belt are made to travel with the timing belt by the provision of the inclined surface, and can be forced into a plastic cylindrical holder 13 mounted on a chain 12 leading to the supply mechanism 4 in the heat transfer station so as to be loosely fitted.

Figure 5:
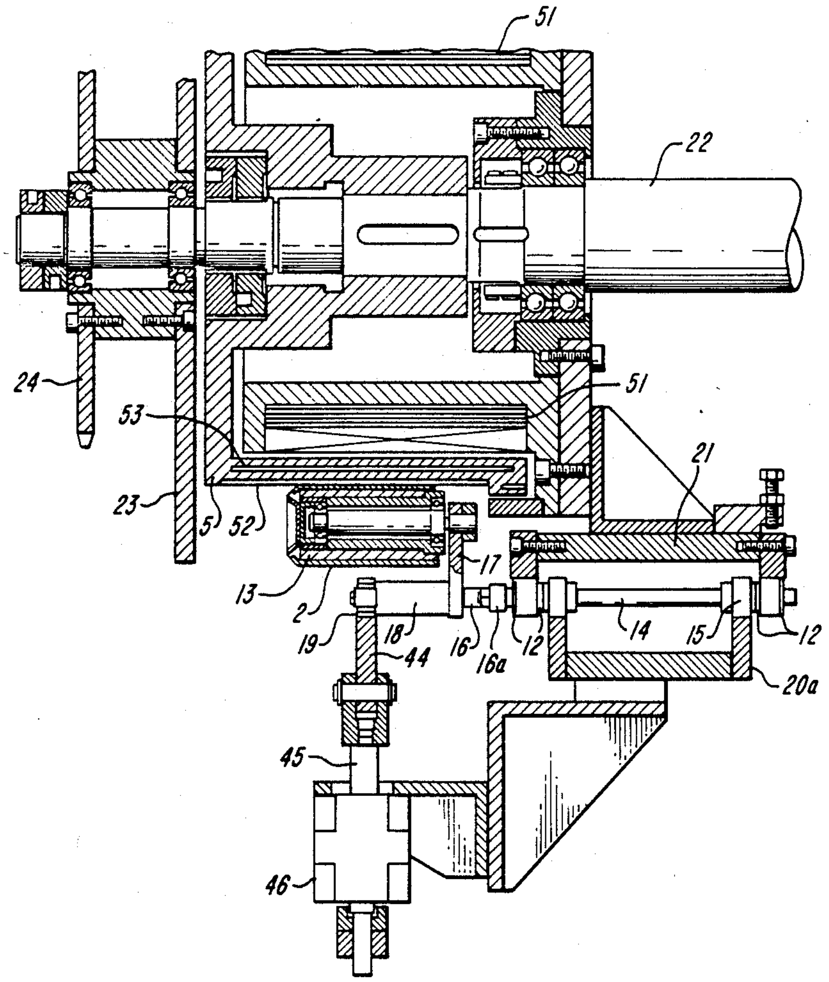
FIG. 5 is a longitudinal sectional side view of a portion of a heat roller.

The aforesaid supply mechanism 4 is annularly formed by the chain 12 as a pass-over moving body. The chain 12 is passed over four sprockets 12*a*, and travels at the lower part thereof with the timing belt 11, whereas at the upper part thereof travels between a guide rail 20*a* parallel with a rail 20 and a guide plate 21 (see FIG. 5).

Figure 4:
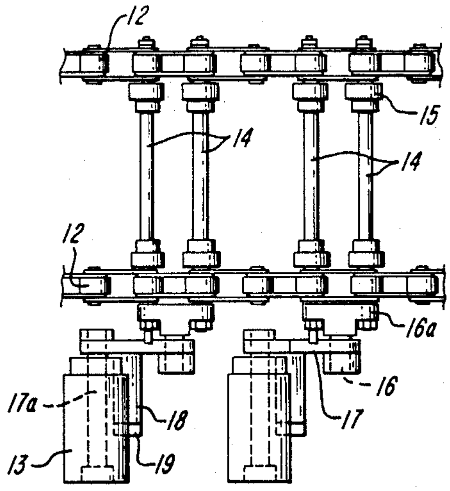
FIG. 4 is a plan view of a holder and a chain.

Rows of a pair of connection shafts 14 laterally extend at fixed intervals through the chain 12 as shown in FIG. 4, each of the connection shafts 14 being rotatably provided with a roller 15. Externally of the chain 12, a bell crank 17 is upwardly rotatably provided on a shaft portion 16 of a seat body 16*a* provided over the ends of a pair of connection shafts 14, and the aforesaid holder 13 is rotatably provided on a support shaft 17*a* externally of the end of the bell crank 17. A guide shaft 18 is provided on a bended portion, and a roller 19 which travels on the rail 20 is provided at the end of the guide shaft 18.

The heat roll 5 is internally provided with a magnetic flux generation mechanism 51 composed of a coil and a core, details of which are not shown, and a jacket 52 with a heating medium 53 sealed therein, a roll surface 52 being formed from a silicone rubber. At the end of the rotary shaft 22 driven by a motor, said end being projected from the heat roll 5, is provided a disk 23 integral with a driving chain sprocket 24.

Internally of the peripheral edge of the disk 23 on the side of the heat roll 5 are fixedly mounted two brackets 27 at equal intervals provided with a press roll 25 and a pitch adjusting roll 26.

The press roll 25 is rotatably mounted through a mounting member 29 on a press roll shaft 28 rotatably inserted into the bracket 27. The press roll shaft 28 extends through the disk 23 and outwardly protrudes, and a press roll shaft arm 30 is secured to the protruded portion. A press arm roller 31 is rotatably provided on the end of the press roll shaft arm 30.

The pitch adjusting roll 26 is mounted on a rotatable eccentric shaft 33 provided on an adjusting roll shaft 32 which is rotatably inserted into the bracket 27 and having one end projected externally of the disk 23. An adjusting roll shaft arm 34 is secured to the projecting end of the adjusting roll shaft 32, and an adjusting arm roller 35 is rotatably provided at the end of the adjusting roll shaft arm 34.

A pawl 36 is integrally provided on the base end of the press roll shaft arm 30, and the other end thereof is always biased by means of a spring 37. The adjusting roll shaft arm 34 is formed with tooth 34*a* meshed with the pawl 36.

Within the outer surface on the introducing side of the disk 23 is positioned an inwardly slightly curved longitudinal cam plate 38 for the press roll 25. The cam plate 38 once severs a connection between the pitch adjusting roll 26 and the press roll 25 through press arm roller 31 having been moved together with the disk 23 and thereafter again holds such a connection after the position of the pitch adjusting roll 26 has been determined to bring the press roll 25 together with the transfer film 6 into pressure contact with the can 2. Between the cam plate 38 for the press roll and the disk 23 are provided at the rear of an upright plate 54 a fixed roller guide 39 and a movable roller guide 39 for the adjusting arm roller 35. The fixed roller guide 40 is formed with a tapered groove 41 to return the pitch adjusting roll 26 to a proper position when the adjusting arm roller 35 is forced in. The movable roller guide 40 causes the pitch adjusting roll 26 to move to adjust a position of the printing layer of the transfer film 6. This movable roller guide 40 is connected to two cylinders 43 through an arm 42 and can be controlled in three stages, upper, middle and lower.

Among twelve pitch adjusting rolls 26 as described above, four of them are rotatable whereas other eight are pre-locked by screws in position. The aforesaid cam plate 38, two guide rollers 39, 40 and cylinder 43 are mounted on the upright plate 54.

Figure 6:
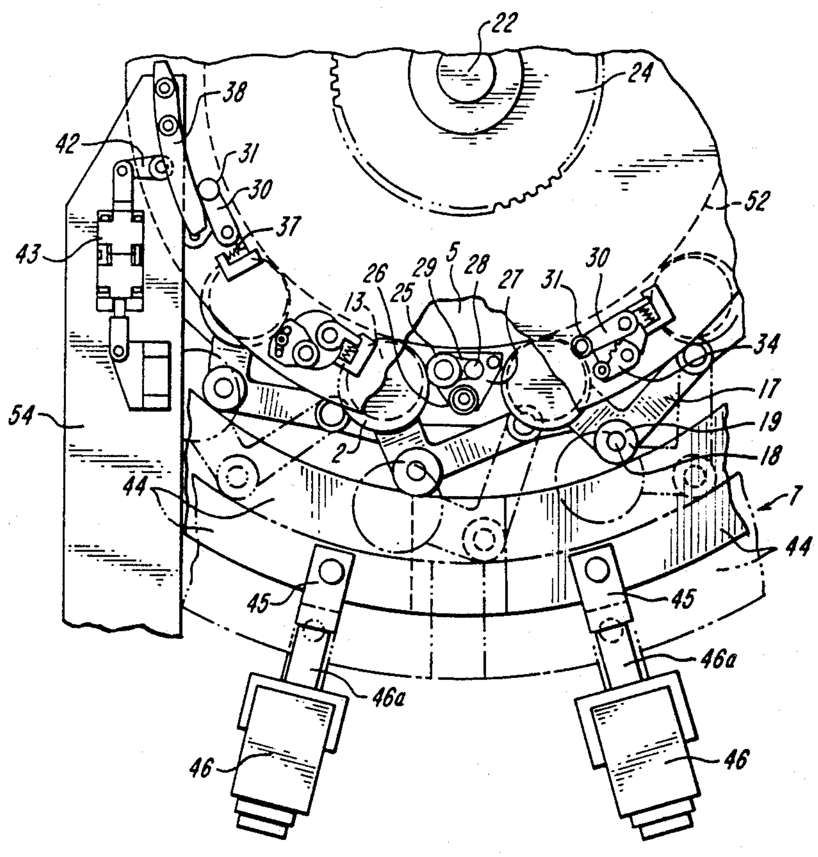
FIG. 6 is a front view showing a transfer portion of a heat roller with a part thereof cutaway.
Figure 7:
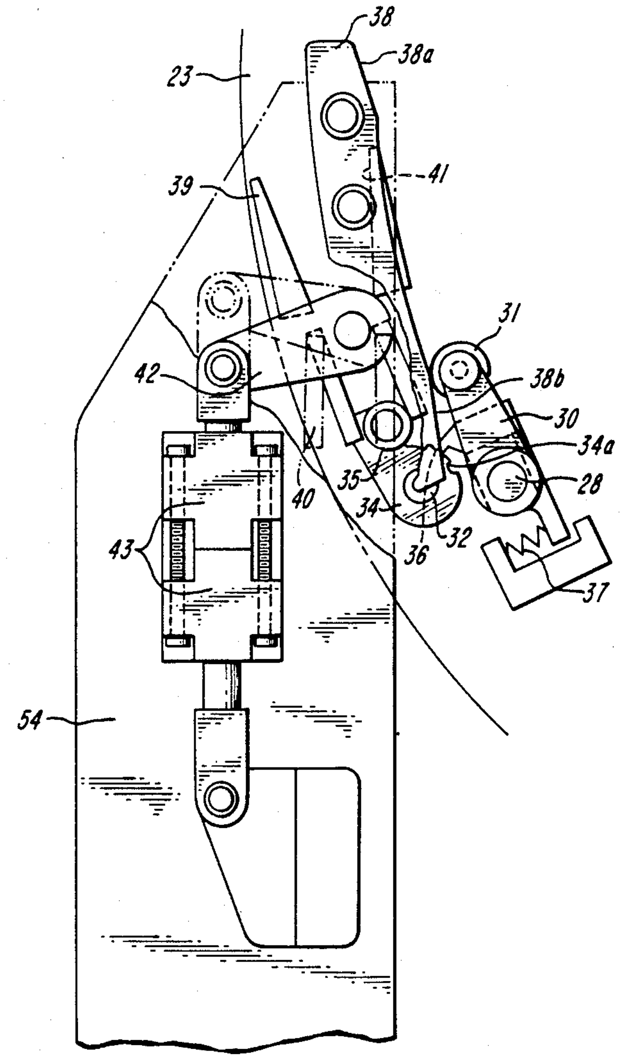
FIG. 7 is a front view showing a position adjusting mechanism for a printing layer with a part thereof cutaway.

A press mechanism 7 for the cans 2 is composed, as shown in FIGS. 3 and 6, a press plate 44 whose upper end is curved along the heat roller 5 between the rails 20, a plurality of connection members 45 rotatably connected to the press plate 44, and an air cylinder 46 whose piston shaft 46*a* is connected to the connection member 45. The press plate 44 is always in contact with the roller 19 of the bell crank 17 to urge the holder 13 against the heat roll 5 by operation of the air cylinder 46 during the transfer but stays lowered at a position in which the holder 13 is moved away from the heat roll 5 as indicated by the chain lines during the non-transfer.

The transfer film supply mechanism 9 is provided, as shown in FIG. 3, with a supply roll 55, a take-up roll 56 and an intermediate guide roller 47, and the transfer film 6 from the supply roll 55 passes between the can 2 and the heat roll 5 and between the press roll 25 and the pitch adjusting roll 26 and thereafter wound on and secured to the take-up roll shaft 56.

The supply roll shaft 55 is provided with an electromagnetic brake for controlling a tension of the transfer film 6 to adjust the tension of the transfer film 6 fed into the heat roll 5 to a predetermined magnitude. Halfway is provided a sensor device 48 for detecting a surface of a printing layer of the transfer film 6 to oscillate an operation command to the cylinder 43.

Reference numeral 49 designates a driving sprocket mounted on a drive shaft (not shown) which actuates the transporting chain 12, and the sprocket 24 integral with the disk 23 is rotated in the same direction as that of the heat roller 5 by the chain 50.

Next, the operation will be described.

First, the transfer film 6 is made to travel to be fed to the heat transfer station. At the same time, when the cans 2 with the open end directed inside are fed into the supply chute, they are delivered at fixed intervals onto the timing belt 11 by the star wheel 10. The cans 2 on the timing belt 11 are successively moved toward the chain 12 by the provision of the inclined surface of the guide rail 3 and loosely fitted in the holders 13. They are further carried to the heat roll 5 along the guide rail 20 by the movement of the chain 12. Since at that time, the press plate 44 is urged up by the cylinder 46, when the roller 19 is shifted from the rail 20 onto the upper surface of the press plate 44, the bellcrank 17 is raised upward about the support shaft 16 and the cans 2 are pressed by the heat roll 5 between the press rolls.

On the other hand, the printing layer of the transfer film 6 is always detected in its position by the sensor device 48. An electric signal is provided every detection on the actuator for the cylinder 43, and in accordance with the signal, the cylinder 43 causes the direction of the movable roller guide 40 at the end of the plunger to vary.

When the press roll 25 and the pitch adjusting roll 26 have been moved to the introducing side of the heat roll 5 by the disk 23 which rotates at the same speed as the chain 12, the arm roller 31 first comes into contact with the tapered portion 38a in the inner upper side of the cam plate 38 for the press roll and moves along the inside thereof. Thereby the press roll shaft 28 is rotated against the spring 37, and therefore the pawl 36 is disengaged from the teeth 34a of the adjusting roll shaft arm 34 to render the pitch adjusting roll 26 free.

When the rotation of the disk 23 further proceeds, the adjusting arm roller 35 moves into the tapered groove 41 of the fixed roller guide 39 and guided to the central portion of the groove by the tapered surface. Then, it moves into the movable roller guide 40 of which direction is preset by the actuation of the cylinder 43. With the passage of the movable roller guide 40, a variation in angle of the pitch adjusting roll 26 in contact with the transfer film 6 occurs, whereby the transfer film 6 is stretched or loosened to make fine adjustment of the position of the printing layer with respect to the cans 2 on the holders.

At the position in which the fine adjustment has been completed, the arm roller 31 is returned to its original position by the tapered portion 38b in the lower inner side of the cam plate 38 for the press roll and the spring pressure, and the pawl 36 of the press roll shaft arm 30 and the teeth 34a of the adjusting roll shaft arm 34 are again meshed with each other whereby the press roll 25 and the pitch adjusting roll 26 are locked with each other and at the same time the press roll 25 causes the transfer film 6 to press against the cans 2.

In this state, when the heat roll 5 together with the disk 23 further rotate, the cans 2 rotate while being pressed against the heat roll 5 and the press roll 25 through the transfer film 6, and so, thereafter. The transfer is effected for the cans 2 in a similar manner to the step as described in connection with FIG. 1.

INDUSTRIAL APPLICABILITY

As described above, according to the present invention, since the induction heating is used as heating means, the temperature control of the heat roller can be easily accomplished, and the transfer film is not melted due to the heating. Furthermore, since the transfer is effected by the press roll after the containers and the transfer film have been heated, the transfer slippage is hard to occur as experienced in the transfer effected on the heat roller, thus completing the transfer operation at high speed. Moreover, the present invention is extremely effective in industry from the fact that the amount of feed of the transfer film can be fine-adjusted by movement of the pitch adjusting roll to prevent a deviation in position. The apparatus of the invention can be extensively utilized.

We claim:

1. A transfer printing apparatus for containers, comprising:

shaft means for providing rotational movement;

heat roller means having a roller surface and secured to said shaft means for providing uniform Joule heat at said roller surface by exothermic low-frequency induction heating;

a disk secured to said shaft means adjacent said roller surface of said heat roller means;

a plurality of press rolls rotatably mounted on said disk and equidistantly spaced thereabout adjacent said roller surface of said heat roller means;

a plurality of pitch adjusting rolls rotatably mounted on said disk and equidistantly spaced thereabout outwardly of and in correspondence with said plurality of press rolls;

each of said plurality of press rolls normally being mechanically engaged with said corresponding pitch adjusting roll;

a segment of said roller surface and corresponding ones of said plurality of press rolls and said plurality of pitch adjusting rolls defining a heat transfer station having an introducing side for said transfer printing apparatus;

transfer film means for providing a printing layer to said introducing side of said heat transfer station, said transfer film means abutting said corresponding ones of said plurality of pitch adjusting rolls of said heat transfer station with said printing layer directed outwardly with respect to said roller surface;

circulating transport means for successively providing holders, having mounted thereon the containers to be labeled, in spaced apart relation to said disk at said introducing side of said heat transfer station between adjacent press rolls so that said transfer film means is disposed intermediate said roller surface and the containers to be labeled, and wherein said holders are rotatably mounted on said circulating transport means and said circulating transport means is operative to provide linear displacement of said holders;

fine-adjustment means positioned at said introducing side of said heat transfer station for coacting with each said press roll and said corresponding pitch adjusting roll rotated into said introducing side to momentarily disengage said corresponding pitch adjusting roll from said press roll to permit adjustment of said corresponding pitch adjusting roll to position said printing layer of said transfer film means with the containers to be labeled; and means operative upon completion of adjustment of said corresponding pitch adjusting roll for pressing said holders on said disk within said heat transfer station against said roller surface to effect transfer of said printing layer of said film transfer means to the containers mounted on said holders within said heat transfer station.

2. The transfer printing apparatus of claim 1 wherein said roller surface of said heat roller means is formed of silicone rubber.

3. The transfer printing apparatus of claim 1 wherein said press rolls and said pitch adjusting rolls are provided on a rotatable shaft mounted parallel to a bracket internally of said disk, and a shaft of said pitch adjusting roll comprises an eccentric shaft.

4. The transfer printing apparatus of claim 1 wherein one end of said press roll shaft and adjusting roll shaft extends through said disk to project externally, said projected end being provided with a press roll shaft arm having a press arm roll pivotably provided at a foremost end thereof and a pawl provided at the base end thereof, and an adjusting roll shaft arm having an adjusting arm roll pivotably provided at the foremost end thereof and teeth meshed with said pawl to provide mechanical engagement between said press roll and said corresponding pitch adjusting roll, said press roll shaft being always biased for mechanical engagement by means of a spring disposed on said disk.

5. The transfer printing apparatus according to claim 4 wherein said fine-adjustment means comprises a cam plate coacting with said press roll positioned within the plane of the disk on said introducing side of said heat roller means, an upright plate between said cam plate, and a fixed roller guide and a movable roller guide vertically provided on said upright plate, said movable roller guide being connected to a flange of a cylinder actuated by a signal from a printing layer detection device for the transfer film means, engagement and release between said pawl and said teeth being effected by connection between said press arm roller and said cam plate, fine adjustment of position of the printing layer to the containers being effected by connection between said adjusting arm roller, said fixed roller guide and movable roller guide.

6. The transfer printing apparatus according to claim 1 wherein said holders have rollers which are rotatably provided at the foremost end of a bell crank mounted for linear displacement by said circulating transport means and which travel on rails formed parallel to the outer edge of said heat roller means on the bended portion of said bell crank and on said pressing plate.

7. The transfer printing apparatus according to claim 1 wherein said holder is formed of synthetic resin.

8. The transfer printing apparatus according to claim 1 wherein said transfer film means is formed from a stretching film.

9. The transfer printing apparatus according to claim 3 wherein one end of said press roll shaft and adjusting roll shaft extends through said disk to be projected externally, said projected end being provided with a press roll shaft arm having a press arm roll pivotably provided at one end thereof and a pawl provided at the other end thereof, and an adjusting roll shaft arm having an adjusting arm roll pivotably provided at one end thereof and teeth meshed with said pawl provided at the other end thereof to provide mechanical engagement between said press roll and said corresponding pitch adjusting roll, said press roll shaft being always biased for mechanical engagement by means of a spring disposed on said disk.

* * * * *

UNITED STATES PATENT AND TRADEMARK OFFICE
CERTIFICATE OF CORRECTION

PATENT NO. : 4,909,888

DATED : March 20, 1990

INVENTOR(S) : Kobayashi, et al.

It is certified that error appears in the above-identified patent and that said Letters Patent is hereby corrected as shown below:

In Column 4, line 21, "finished" should read --finishes--

In Column 5, line 65, "40" should read --39--.

Signed and Sealed this

Second Day of June, 1992

*Attest:*

DOUGLAS B. COMER

*Attesting Officer*

*Acting Commissioner of Patents and Trademarks*